US012581468B2

(12) United States Patent
Beale et al.

(10) Patent No.: US 12,581,468 B2
(45) **Date of Patent: \*Mar. 17, 2026**

(54) APPARATUS AND METHOD FOR A MOBILE TELECOMMUNICATIONS SYSTEM

(71) Applicants: Sony Group Corporation, Tokyo (JP); Sony Mobile Communications Inc., Tokyo (JP)

(72) Inventors: Martin Warwick Beale, Basingstoke (GB); Shin Horng Wong, Basingstoke (GB); Samuel Asangbeng Atungsiri, Basingstoke (GB); Basuki Priyanto, Lund (SE)

(73) Assignees: Sony Group Corporation, Tokyo (JP); Sony Mobile Communications Inc., Tokyo (JP)

( \* ) Notice: Subject to any disclaimer, the term of this patent is extended or adjusted under 35 U.S.C. 154(b) by 0 days.

This patent is subject to a terminal disclaimer.

(21) Appl. No.: 18/513,700

(22) Filed: Nov. 20, 2023

(65) Prior Publication Data

US 2024/0107505 A1    Mar. 28, 2024

Related U.S. Application Data

(63) Continuation of application No. 17/878,120, filed on Aug. 1, 2022, now Pat. No. 11,825,455, which is a
(Continued)

(30) Foreign Application Priority Data

Mar. 24, 2017    (EP) .................................... 17162920

(51) Int. Cl.
*H04W 72/04* (2023.01)
*H04L 1/00* (2006.01)
*H04W 72/0446* (2023.01)

(52) U.S. Cl.
CPC ....... *H04W 72/0446* (2013.01); *H04L 1/0068* (2013.01)

(58) Field of Classification Search
CPC ......... H04W 72/0446; H04W 72/0453; H04W 72/048; H04W 72/10; H04W 4/70;
(Continued)

(56) References Cited

U.S. PATENT DOCUMENTS

2008/0075187 A1    3/2008    Sutskover
2015/0270931 A1\*    9/2015    Sun ....................... H04W 72/23
370/329
(Continued)

FOREIGN PATENT DOCUMENTS

CN    101123599 A    2/2008
CN    102870367 A    1/2013
(Continued)

OTHER PUBLICATIONS

International Search Report and Written Opinion mailed on Jun. 11, 2018 for PCT/EP2018/057147 filed on Mar. 21, 2018, 10 pages.
(Continued)

*Primary Examiner* — Dady Chery
(74) *Attorney, Agent, or Firm* — XSENSUS LLP

(57) ABSTRACT

An apparatus comprising circuitry configured to perform a transport channel processing chain, the transport channel processing chain comprising a sub-carrier puncturing function, the sub-carrier puncturing function comprising puncturing, in each subframe of a composite transmission time
(Continued)

interval, a set of subcarriers from at least one mapped physical resource block.

17 Claims, 12 Drawing Sheets

Related U.S. Application Data continuation of application No. 16/495,103, filed as application No. PCT/EP2018/057147 on Mar. 21, 2018, now Pat. No. 11,405,912.

(58) Field of Classification Search
CPC ... H04W 72/231; H04W 76/15; H04W 76/34; H04W 8/24; H04L 1/0068; H04L 5/0044; H04L 5/0094; H04L 5/0076; H04L 5/0046; H04L 5/0035; H04L 5/0064; H04L 5/0096; H04L 41/0853; H04L 41/5067
See application file for complete search history.

(56) References Cited

U.S. PATENT DOCUMENTS

| | | | |
|---|---|---|---|
| 2015/0341956 A1* | 11/2015 | Sun | H04L 1/0046 |
| | | | 370/329 |
| 2016/0072614 A1* | 3/2016 | Blankenship | H04W 72/0453 |
| | | | 370/329 |
| 2018/0083817 A1* | 3/2018 | Salem | H04L 5/0005 |
| 2019/0379487 A1* | 12/2019 | Hwang | H04L 1/1887 |

FOREIGN PATENT DOCUMENTS

| | | |
|---|---|---|
| CN | 103039120 A | 4/2013 |
| CN | 105519226 A | 4/2016 |
| WO | 2016/070415 A1 | 5/2016 |

OTHER PUBLICATIONS

Intel Corporation, "Frequency Domain Aspects of NR Data Scheduling", 3GPP TSG RAN WG1 NR Ad-Hoc Meeting R1-1700373, Spokane, USA, Jan. 16-20, 2017, 5 pages.
3GPP, "LTE; Evolved Universal Terrestrial Radio Access (E-UTRA); Physical channels and modulation", 3GPP TS 36.211 version 14.2.0 Release 14, ETSI TS 136 211 V14.2.0, Apr. 2017, pp. 1-195.
3GPP, "LTE; Evolved Universal Terrestrial Radio Access (E-UTRA); Multiplexing and channel coding", 3GPP TS 36.212 version 14.2.0 Release 14, ETSI TS 136 212 V14.2.0, Apr. 2017, pp. 1-205.
3GPP, "LTE; Evolved Universal Terrestrial Radio Access (E-UTRA); Physical layer procedures", 3GPP TS 36.213 Version 14.2.0 Release 14, ETSI TS 136 213 V14.2.0, Apr. 2017, pp. 1-455.
Ericsson et al., "New WID on Even further enhanced MTC for LTE", 3GPP TSG RAN Meeting No. 75 RP-170732 (revision of RP-170465), Dubrovnik, Croatia, Mar. 6-9, 2017, 4 pages.
Huawei, HiSilicon, China Telecom, "Uplink frame structure design", 3GPP TSG RAN WG1 NB-IoT Ad-Hoc Meeting R1-160183, Budapest, Hungary, Jan. 18-20, 2016, 6 pages.
Intel Corporation, "On coverage , enhancements for PUSCH for MTG", 3GPP TSG RAN WG1 Meeting#80 R1-150748, Athens, Greece, Feb. 9-13, 2015, 11 pages.

* cited by examiner

Physical Resource
Block (PRB)

201 — CRC attachment

202 — Turbo coding

203 — Interleaving

204 — Rate matching

205 — Scrambling

206 — Modulation

208 — RS Generation

207 — RE Mapping

209 — DFT-s-OFDM

701    CRC attachment

702    Turbo coding

703    Interleaving

704    Rate matching

705    Scrambling

706    Modulation

707    RE Mapping

708    Subcarrier puncturing

709    Subcarrier rearrangement

710    RS Generation

711    DFT-s-OFDM

1101 — CRC attachment

1102 — Turbo coding

1103 — Interleaving

1104 — Rate matching

1105 — Scrambling

1106 — Modulation

1107 — RE Mapping

1108 — Subcarrier puncturing

1109 — Subcarrier rearrangement

1110 — RS Generation

1111 — Multiplexing

1112 — Subcarrier repetition

1113 — DFT-s-OFDM

APPARATUS AND METHOD FOR A MOBILE TELECOMMUNICATIONS SYSTEM

CROSS-REFERENCE TO RELATED APPLICATIONS

The present application is a continuation of U.S. application Ser. No. 17/878,120, filed Aug. 1, 2022, which is a continuation of U.S. application Ser. No. 16/495,103, filed Sep. 18, 2019, (Now U.S. Pat. No. 11,405,912) which is based on PCT filing PCT/EP2018/057147, filed Mar. 21, 2018, which claims priority to EP 17162920.7, filed Mar. 24, 2017, the entire contents of each are incorporated herein by reference.

TECHNICAL FIELD

The present disclosure generally pertains to entities and user equipment of a mobile telecommunications system.

TECHNICAL BACKGROUND

The term "Internet of things" (IoT) denotes the inter-networking of physical devices, vehicles, buildings, and other items that are provided with electronics, software, sensors, actuators, and network connectivity that enable these objects to collect and exchange data. Such objects are also referred to as "connected devices" and "smart devices".

Machine-type Communication (MTC) enables IoT devices to exchange information in an autonomous way without human intervention. 3GPP is in the process of improving LTE networks for Machine-type Communication (MTC). Examples are enhanced NB-IoT (eNB-IoT) with new power classes, improved mobility support and multicast messaging, or further enhancements for eMTC (feMTC) including VoLTE support and multicast messaging. These improvements are the next steps in the direction of 5G networks for massive MTC (mMTC).

eMTC (enhanced Machine Type Communication) is a 3GPP IoT technology that supports low-cost and high cov-erage for such machine-type communication devices. The technology is based on Long Term Evolution ("LTE") and eMTC devices are supported within an LTE host carrier.

Long Term Evolution ("LTE") is a candidate for provid-ing the requirements of 5G, which is a wireless communi-cation technology allowing high-speed data communica-tions for mobile phones and data terminals and which is already used for 4G mobile telecommunications systems. Other candidates for meeting the 5G requirements are termed New Radio Access Technology Systems (NR). An NR can be based on LTE technology, just as LTE was based on previous generations of mobile communications technol-ogy. LTE is based on the GSM/EDGE ("Global System for Mobile Communications"/"Enhanced Data rates for GSM Evolution" also called EGPRS) of the second generation ("2G") and UMTS/HSPA ("Universal Mobile Telecommu-nications System"/"High Speed Packet Access") of the third generation "3G") network technologies. LTE is standardized under the control of 3GPP ("3rd Generation Partnership Project"). There exists a successor LTE-A (LTE Advanced) allowing higher data rates than the basic LTE which is also standardized under the control of 3GPP. For the future, 3GPP plans to further develop LTE-A, such that it will be able to fulfill the technical requirements of 5G.

Although there exist signaling techniques for Machine-type Communication (MTC), it is generally desirable to improve the signaling in such technologies.

SUMMARY

According to a first aspect the disclosure provides an apparatus including circuitry configured to perform a trans-port channel processing chain, the transport channel pro-cessing chain including sub-carrier puncturing function, the sub-carrier puncturing function including puncturing, in each subframe of a composite transmission time interval, a set of subcarriers from at least one mapped physical resource block.

According to a further aspect, the disclosure provides an apparatus including circuitry configured to receive sets of a predefined number of subcarriers in each subframe and consider the remaining subcarriers as being punctured.

According to a further aspect the disclosure provides a method for performing a transport channel processing chain, the transport channel processing chain including sub-carrier puncturing, the sub-carrier puncturing function including puncturing, in each subframe of a composite transmission time interval, a set of subcarriers from at least one mapped physical resource block.

Further aspects are set forth in the dependent claims, the following description and the drawings.

BRIEF DESCRIPTION OF THE DRAWINGS

Embodiments are explained by way of example with respect to the accompanying drawings, in which.

DETAILED DESCRIPTION OF EMBODIMENTS

Figure 1:
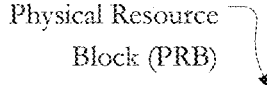
FIG. 1 illustrates a PUSCH PRB with normal CP con-figuration.
Figure 1:
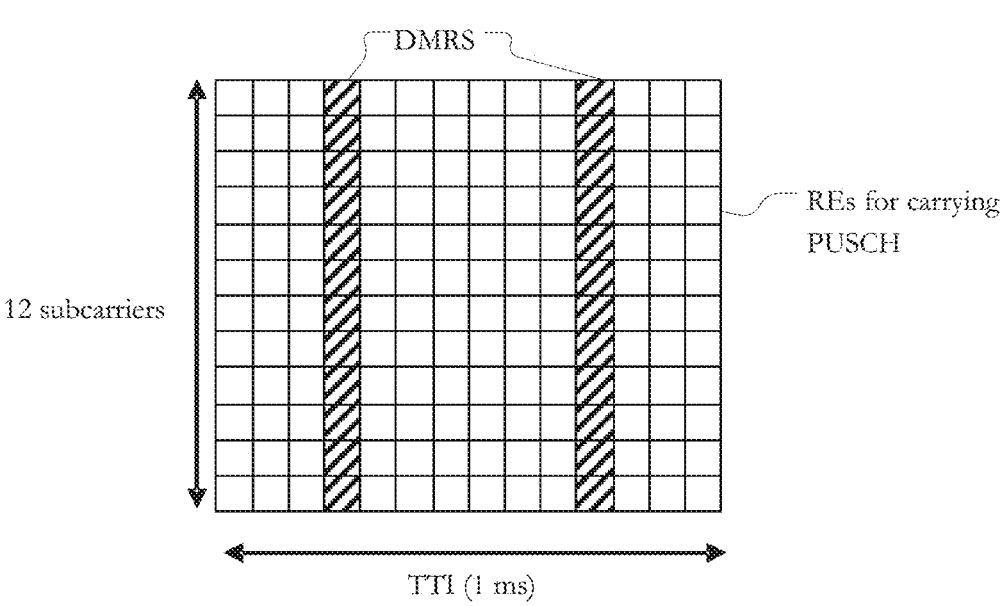

Before a detailed description of the embodiments under reference of FIG. 1, general explanations are made.

In the LTE Uplink (LTE UL), the base station scheduler allocates resources to User Equipments (UEs) to use for the transmission of packets in the UL. When data is to be transmitted by the UE, these UL resources are Physical Uplink Shared Channel resources (PUSCH).

As the path loss between the UE and the base station increases, the size of an Uplink allocation to a UE decreases, according to scheduler policy at the base station. It is advantageous to reduce the PUSCH allocation to the UE since the UE is transmit power limited (typically the maximum UE transmit power is 23 dBm). By narrowing the transmission bandwidth, a targeted power spectral density (PSD) of the signal received by the base station can be maintained. It is advantageous to work with an approximately constant PSD at the base station since (1) the demodulation error rate performance of the PUSCH transmission is a function of the PSD, (2) reception of PUSCH with similar PSDs at the base station reduces the dynamic range of the base station receiver and (3) reception of PUSCH with equal PSDs mitigates against spectral leakage of a PUSCH received with high PSD from one PUSCH interfering with reception of a PUSCH with low PSD in adjacent frequency resources. It is also advantageous to transmit with smaller amounts of physical resource (at a higher PSD) since this allows for more PUSCH (and hence more UEs) to be multiplexed into the available physical resources.

In Release-14 feMTC (and earlier releases), the minimum UL resource that can be allocated to a UE is 1 Physical Resource Block (PRB) made up of 12 sub-carriers.

The embodiments described below disclose an apparatus including circuitry configured to perform a transport channel processing chain, the transport channel processing chain including sub-carrier puncturing including circuitry configured to perform a transport channel processing chain, the transport channel processing chain including sub-carrier puncturing function, the sub-carrier puncturing function including puncturing, in each subframe of a composite transmission time interval, a set of subcarriers from at least one mapped physical resource block.

It will be understood that the term "transport channel processing chain" includes elements that are described in 3GPP specifications as a "physical channel processing chain" (where in the transmitter, transport channel processing is performed before physical channel processing). The general term "transport channel processing chain" used herein thus includes some aspects of transport channel processing and some aspects of physical channel processing.

An apparatus as described in the embodiments may for example be a mobile telecommunications system entity, in particular user equipment, a base station (eNodeB), or the like. In particular, the apparatus including circuitry configured to perform a transport channel processing chain, the transport channel processing chain including sub-carrier puncturing may be a User Equipment (UE) that transmits a PUSCH transmission to a base station.

Circuitry may include at least one of: processor, microprocessor, dedicated circuit, memory, storage, radio interface, wireless interface, network interface, or the like, e.g. typical electronic components which are included in a base station, such as an eNodeB.

The apparatus may for example be used in an IoT-device for the inter-networking of connected devices and smart devices. For example, the apparatus may be used in physical devices, vehicles, buildings, and other items that are provided with electronics, software, sensors, actuators, and network connectivity that enable these objects to collect and exchange data.

In particular, the apparatus may be used in a Machine-type Communication (MTC) scenario to allow the exchange of information in an autonomous way without human intervention.

The apparatus may for example be a 3GPP compliant communication device, e.g. an LTE or advanced LTE type device. The apparatus may for example provide the requirements of 5G or other New Radio Access Technology Systems (NR).

The apparatus may also be compliant with eMTC (enhanced Machine Type Communication), feMTC (further enhanced Machine Type Communication), or efeMTC (even further enhanced Machine Type Communication). In particular, the embodiments described below may provide a transmission scheme for efeMTC sub-PRB PUSCH transmissions. The transmission scheme for efeMTC sub-PRB PUSCH transmissions according to the embodiments may be compatible with legacy hardware.

A transport channel processing chain may for example relate to an UL Shared Channel (UL-SCH) and/or Physical Uplink Shared Channel (PUSCH) or any other kind of shared communication channel.

Puncturing may relate to any function that selects subcarriers of a physical resource block (PRB) and disregards the remaining subcarriers.

The circuitry may further be configured to puncture, in each subframe (ITI) of a composite transmission time interval (CTTI), a set of subcarriers from a mapped physical resource block (PRB). A composite transmission time interval (CTTI) may be any composition of multiple transmission time intervals (ITIs). In the following embodiments, a TTI of a CTTI is also denoted as a subframe of the CTTI. Each subframe of the CTTI may be regarded as a PUSCH transmission. A composite transmission time interval (CTTI) may for example include two or four or more subframes (ITI).

The circuitry may be configured to puncture the set of subcarriers so that the sets of subcarriers that are punctured are different between subframes (ITI). For example, in a subcarrier puncturing process, in the first subframe of a CTTI, the lowest 3 subcarriers of 12 subcarriers are kept and the other 9 subcarriers are punctured. Accordingly, in the second subframe of the CTTI, the next 3 subcarriers are kept and the other 9 subcarriers are punctured, etc.

The transport channel processing chain may for example be based on a composite transmission time interval (CTTI) that includes two or more subframes (ITI). A composite transmission time interval (CTTI) may for example include two, four, or twelve subframes, where each subframe is a 1 ms transmission time interval (ITI).

The transport channel processing may include mapping, in each subframe (TTI) of a composite transmission time interval (CTTI), a transport block to an integer number of physical resource blocks (PRBs) in a single subframe (TTI).

The mapping may for example include mapping transport blocks to a 12 subcarrier physical resource block (PRB) (integer number of physical resource blocks=1) and the subcarrier puncturing is performed on these 12 subcarriers (such as described with regard to the embodiment of FIG. 6 below). Alternatively, transport blocks may be mapped to two physical resource block (PRB) with 24 subcarrier in total (integer number of physical resource blocks=2) and the subcarrier puncturing is performed on these 24 subcarriers (such as described with regard to the embodiment of FIG. 9 below).

The transport channel processing may further include rearranging, the subcarriers that remain after puncturing, in the frequency domain to occupy the same frequency resources. A sub-carrier rearrangement function may for example be configured such that the non-punctured subcarriers are rearranged to fit into the allocated PUSCH resources. For example, only three sub-carriers may be allocated to a user equipment (UE) and the sub-carrier rearrangement function may rearrange the subcarriers so that they are located in these three sub-carriers that are allocated to a user equipment (UE). The remaining subcarriers may for example be allocated to other user entities or they may remain unused. The transport channel processing chain may thus allow for the transmission of sub-PRB PUSCH. Using a low number of allocated sub-carriers in sub-PRB PUSCH may allow for massive MTC (mMTC).

Sub-PRB transmissions may allow for more UEs to be multiplexed into the same resource in the frequency domain. Sub-PRB transmissions may allow for higher PSD transmissions by the UE, improving decoding performance at the base station. Still further, sub-PRB transmissions may have a lower peak to average power ratio, leading to lower power amplifier backoffs and higher power amplifier efficiency.

The embodiments described below may in particular provide a 3 subcarrier sub-PRB transmission. The sub-PRB transmission may be encoded by previously known means.

The embodiments described below enable efeMTC to also support sub-PRB transmissions. According to some embodiments, sub-PRB transmissions are implemented such that they are compatible with legacy hardware.

The circuitry may be for example be configured to transmit a 3 subcarrier sub-PRB transmission or a 6 subcarrier sub-PRB transmission.

The composite transmission time interval (CTTI) may include a fixed predefined number of subframes and the base number of physical resource blocks (PRBs) may be changed depending on the number of sub-carriers to be used in a sub-PRB transmission. The fixed predefined number of subframes may for example be four subframes (e.g. CTTI=4 ms) and the base number of physical resource blocks may either be one or two, depending on the number of sub-carriers used in a sub-PRB transmission. For example, for a 6 subcarrier sub-PRB transmission, the base number of physical resource blocks may be chosen as two (such as described with regard to the embodiment of FIG. 9 below), and for a 3 subcarrier sub-PRB transmission, the base number of physical resource blocks may be chosen as one (such as described with regard to the embodiment of FIG. 6 below).

Alternatively or in addition, the base number of physical resource blocks (PRBs) may be fixed to a predefined number and the composite transmission time interval (CTTI) may be adapted to the number of sub-carriers used in the sub-PRB transmission. For example, the base number of physical resource blocks (PRBs) may be fixed to the predefined number 1 and the composite transmission time interval (CTTI) may change depending on the number of sub-carriers used in the sub-PRB transmission. For example, with a 3 sub-carrier transmission a CTIM=4 ms may be used (such as described with regard to the embodiment of FIG. 6 below), whereas for a 6 sub-carrier transmission, a CTTI=2 ms may be used (such as described with regard to the embodiment of FIG. 8 below).

The circuitry may be configured to signal the sub-PRB allocation using DCI (downlink control channel information) signaling. For example, the sub-PRB allocation to the device can be signaled using DCI (downlink control channel information) signaling, by extending the resource allocation field in the DCI message that allocates UL resource (i.e. by extending the resource allocation field in DCI format 6-OA and/or DCI format 6-OB). This can for example be implemented as a new DCI format (e.g. "DCI format 6-OC").

The circuitry may also be configured to indicate its uplink transmission preferences to the network via higher layer signaling.

The transport channel processing chain may further include repeating resource elements in other subcarriers of a sub-PRB waveform in the same subframe (ITI). For example, a resource element of each OFDM symbol of the single carrier is repeated in other subcarriers of an N-sub-carrier sub-PRB waveform in the same OFDM symbol.

A sub-carrier repetition function may be added to emulate a single subcarrier transmission, i.e. a 3 sub-carriers PUSCH is emulated to have the characteristics of a single sub-carrier PUSCH transmission which may reduce the Peak-to-Average Power Ratio (PAPR).

The circuitry may for example be configured to map a transport block (TrBlk_n) to a single subcarrier per subframe, and the transport channel processing chain may include repeating the resource elements of each subframe of the single carrier in other subcarriers in the same subframe. For example, a sub-carrier repetition function may be introduced where a single sub-carrier is copied across X number of consecutive sub-carriers (e.g. X=3, 6, 9) of a sub-PRB waveform.

The circuitry may be configured to transmit the individual subcarriers with different power. For example, a central subcarrier transmits 50% of the total transmit power and the two adjacent subcarriers each transmit 25% of the total transmit power.

The transport channel processing chain includes multiplexing of reference signals.

The circuitry may be configured to assign a user equipment (UE) to perform low Peak-to-Average Power Ratio (PAPR) uplink transmission via downlink control message signalling.

Hence the embodiments may allow to create a transmission scheme for efeMTC sub-PRB PUSCH transmissions that reduces the peak to average power ratio of the transmitted waveform.

The embodiments described below also disclose an apparatus including circuitry configured to receive sets of a predefined number of subcarriers in each subframe and consider the remaining subcarriers as being punctured.

Such an apparatus may for example be a base station (eNodeB) that is configured to receive sub-PRB transmissions from User Equipment (UE).

The embodiments described below also disclose a method for performing a transport channel processing chain, the transport channel processing chain including sub-carrier puncturing. The transport channel processing chain may further include rearranging the subcarriers that remain after puncturing in the frequency domain to occupy the scheduled/allocated frequency resources. Still further, the transport channel processing chain may further include repeating resource elements in other subcarriers of a sub-PRB waveform in the same subframe (ITI).

The embodiments also disclose a computer program including instructions, the instructions when executed on a processor performing a transport channel processing chain, the transport channel processing chain including sub-carrier puncturing.

The embodiments also disclose a machine-readable medium storing such a computer program.

FIG. 1 illustrates a PUSCH PRB with normal Cyclic Prefix (CP) configuration. A single PRB consists of 12 subcarriers and 14 SC-FDMA symbols, where the 12 subcarriers are multiplexed and transmitted using a DFT-s-OFDM waveform. The transmission time interval TTI (time interval over which a transport block is transmitted) is 1 ms. Hence, when a single PRB is assigned for PUSCH, the transport blocks are mapped to Resource Elements (RE)

occupying 12 subcarriers and 1 ms. Demodulation reference signals (DMRS) are inserted for channel estimation and for coherent demodulation.

Figure 2:
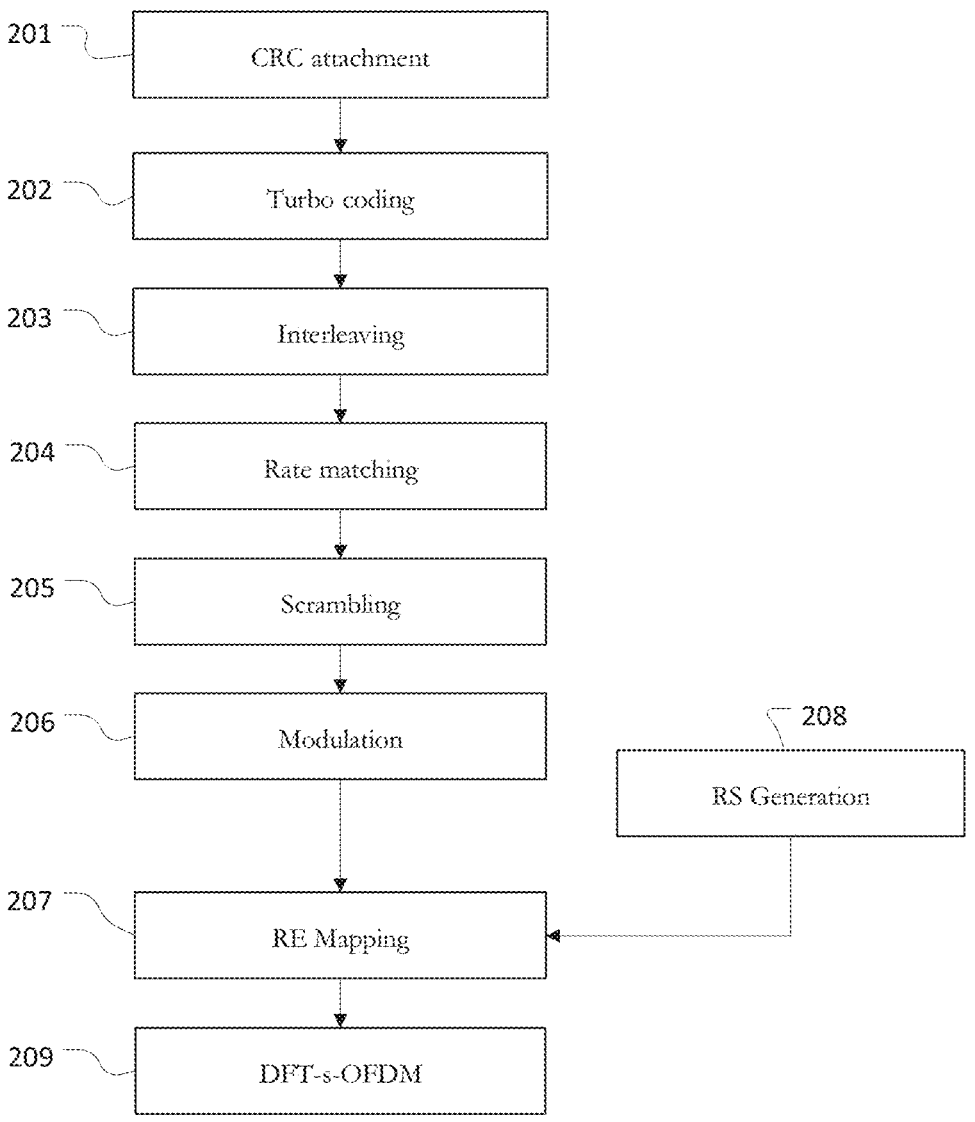
FIG. 2 illustrates the PUSCH transport channel process-ing chain.

FIG. 2 illustrates the mapping operations of the PUSCH transport channel processing chain. At 201, CRC attachment is performed. 24 bit CRC is used. At 202, turbo coding is performed. A 1/3 code rate mother code is used. At 203, interleaving is performed. Bits are interleaved across a time span of at most 1 ms. At 204, rate matching is performed. In order to create other code rates, repetition or puncturing of the output bits may be performed in a rate matching operation. At 205, scrambling is performed. Scrambling may be UE specific, cell specific and slot specific. At 206, modulation is performed. At the cell edge, QPSK modulation is applied. 16QAM can alternatively be applied, according to scheduler decisions. At 207, Resource element (RE) mapping is performed. The modulation symbols are mapped to subcarriers and SC-FDMA symbols in the resource grid. At 208, reference signal (RS) generation is performed. Demodulation reference signals (DMRS) are inserted into the resource element space to allow the base station to channel estimate and receive the signal. At 209, DFT-s-OFDM signal generation is performed. The resource elements are applied to this function to create the transmitted waveform.

Figure 3:
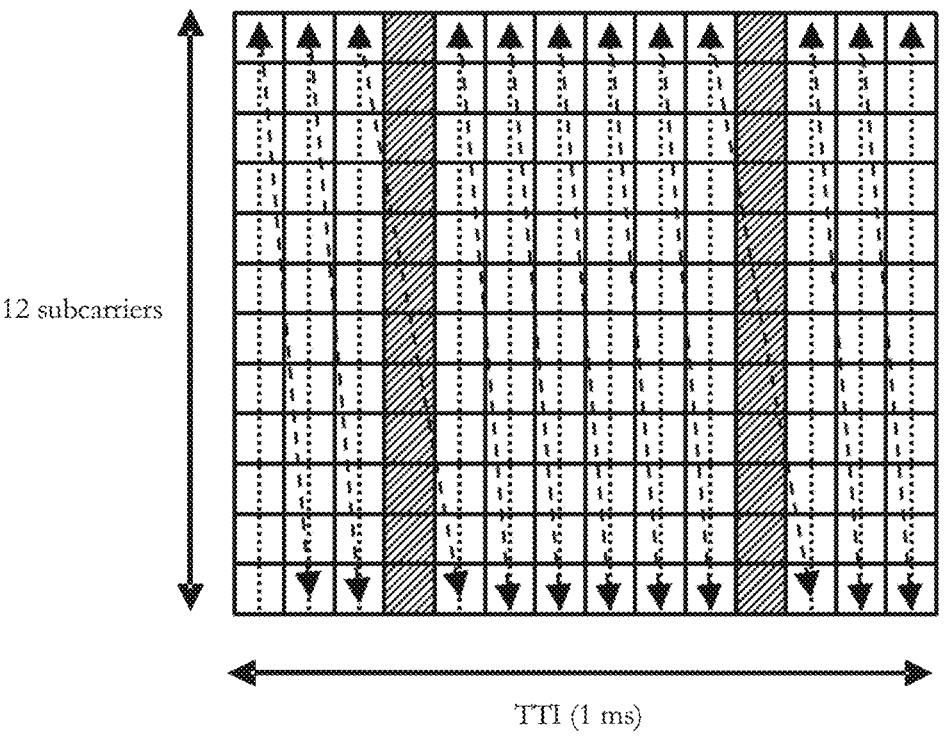
FIG. 3 illustrates the order of resource element mapping for PUSCH in feMTC.

FIG. 3 illustrates the order of resource element mapping for PUSCH in feMTC, i.e. how in feMTC modulation symbols are mapped to resource elements in a frequency-first (dotted lines), time-second order (dashed lines).

The coverage of the PUSCH can be enhanced through repetition. In its basic form, when repetition coding is applied, for each TTI, the transport channel processing chain is executed and an identical set of physical bits (and resource elements) is mapped in subsequent subframes. In a more sophisticated form, different redundancy versions (RVs) are mapped to different subframes (where different redundancy versions contain different sets of rate matched bits: different sets of parity and systematic bits from the turbo code) when repetition is applied. The redundancy versions can be cycled according to a known pattern (e.g. RV 0,2,1,3), in which case "RV cycling" is said to be applied. In either case, the transport channel processing chain is executed in each subframe and a set of bits is mapped to the PUSCH.

Figure 4:
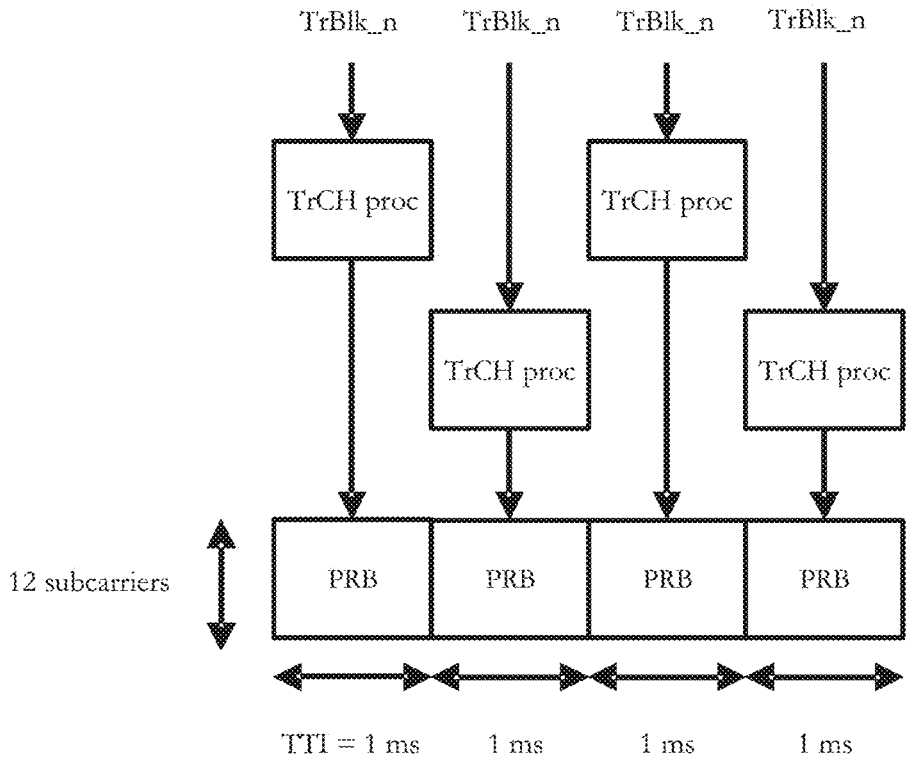
FIG. 4 illustrates repetition coding for PUSCH.

FIG. 4 illustrates repetition coding for PUSCH. The figure shows the same transport block TrBlk_n being fed into the transport channel processing chain TrCH_proc and mapped to consecutive subframes. The base station receiver can combine the received resource elements on a subframe by subframe basis.

In NB-IoT [2], sub-PRB transmissions are possible. A sub-PRB transmission consists of less than 12 subcarriers. Sub-PRB transmissions of 1, 3 and 6 subcarriers are possible in NB-IoT. When a sub-PRB transmission is used, the resources are expanded in the time domain: i.e. one transport block is mapped, interleaved and rate matched across more than one subframe. The following combinations are applied: 1 subcarrier and 8 subframes, 3 subcarriers and 4 subframes, 6 subcarriers and 2 subframes, or 12 subcarriers and 1 subframe.

Figure 5:
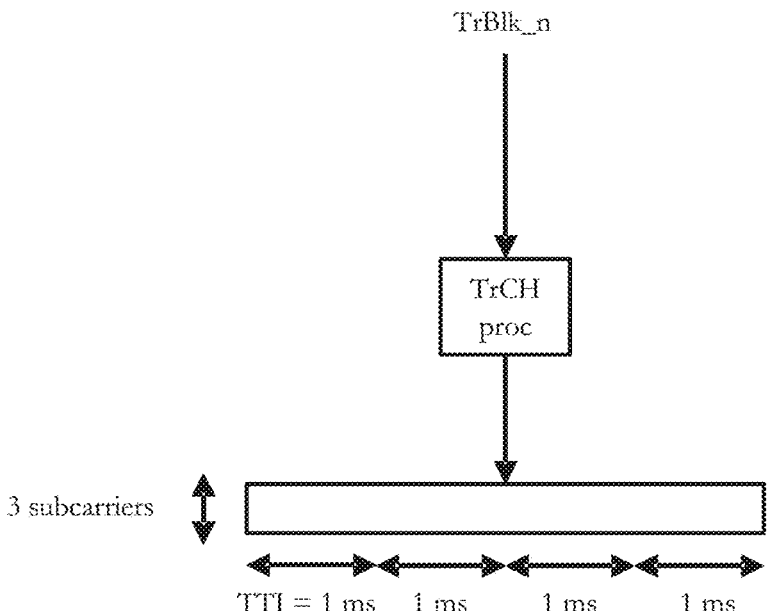
FIG. 5 shows an example mapping of a transport block to 3 subcarriers over 4 subframes in NB-IoT.

FIG. 5 shows an example mapping of a transport block to 3 subcarriers/4 subframes in NB-IoT. This figure shows that by means of the transport channel processing chain TrCH_proc a single transport block TrBlk_n is interleaved, rate matched and mapped to resources consisting of 3 subcarriers and 4 subframes. This form of mapping of transport blocks to physical transmission resources shown in FIG. 5 is not compatible with legacy feMTC hardware since it interleaves PUSCH transmissions across multiple subframes, requiring buffering to be available in the UE and base station that can be accessed and interleaved over multiple subframes.

Sub-Carrier Puncturing

In the embodiments described below, sub-carrier puncturing is described. The sub-carrier puncturing is targeted at allowing for the transmission of sub-PRB PUSCH.

In a first embodiment, the composite transmission time interval (CTTI) is variable and transport blocks are always initially mapped to a 12 subcarrier PRB. A sub-PRB transmission is associated with a longer CTTI and in each subframe of the CTTI the following operations are performed: The transport block is mapped to an integer number of PRBs in a single subframe. In each subframe of the CTTI, a set of subcarriers is punctured from the mapped PRBs. The set of subcarriers that are punctured is different between subframes (e.g. the subcarriers that are punctured are arranged according to a circular buffer principle). And the remaining subcarriers can be rearranged in the frequency domain to occupy the same frequency resources and are modulated (e.g. via DFT-s-OFDM) and transmitted.

Figure 6:
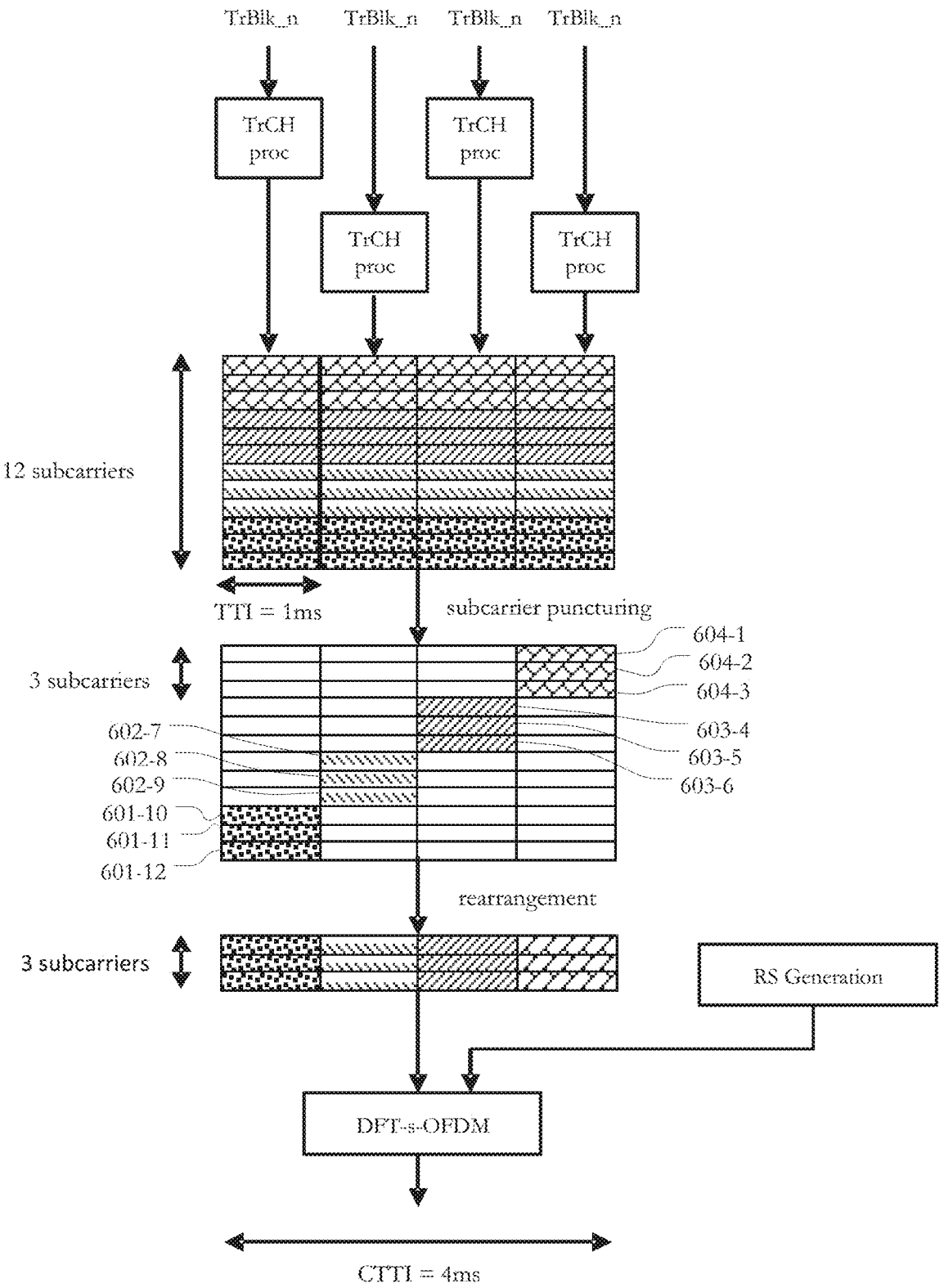
FIG. 6 shows an example method of transmission of a 3 subcarrier sub-PRB transmission.

FIG. 6 shows an example method of transmission of a 3 subcarrier sub-PRB transmission. In each subframe of the CTI, the transport block is mapped to 12 subcarriers, up to and including the resource element mapping stage. Subcarrier puncturing is performed on these 12 subcarriers. In the subcarrier puncturing process, in the first subframe of the CTTI, the lowest 3 subcarriers 601-10, 601-11, 601-12 of the 12 subcarriers are kept and the other 9 subcarriers are punctured. Accordingly, in the second subframe of the CTTI, the next 3 subcarriers 602-7, 602-8, 602-9 are kept and the other 9 subcarriers are punctured. Accordingly, in the third subframe of the CTTI, the next 3 subcarriers 603-4, 603-5, 603-6 are kept and the other 9 subcarriers are punctured. Accordingly, in the fourth subframe of the CTTI, the next 3 subcarriers 604-1, 604-2, 604-3 are kept and the other 9 subcarriers are punctured. In a next operation, the remaining subcarriers are rearranged to occupy the same 3 subcarriers. Then, reference signals (RS) are generated and inserted into the 3 subcarriers of the sub-PRB transmission. Finally, the signal is DFT-s-OFDM modulated and transmitted.

The receiver (at the base station) may operate on similar principles. It can receive sets of 3 subcarriers in each subframe and consider the other 9 subcarriers as being punctured (e.g. by insertion of zero LLRs). This mixture of received symbols and punctured bits can be de-rate matched and combined in the receiver's soft combining buffer, as per legacy operation.

According to this embodiment, the order of mapping of modulation symbols to REs is now no longer in a frequency first, time second order (i.e. is now different to the RE mapping order described in FIG. 3). In this embodiment, the first 3 modulation symbols (indexed 0, 1, 2) are mapped to the first OFDM symbol of the first subframe, the next 3 modulation symbols are mapped to the first OFDM symbol of the second subframe, etc. Still further, the modulation symbols indexed 12 to 14 are mapped to the second OFDM symbol of the first subframe, etc. It will be understood that what is pertinent to the embodiments is the order in which modulation symbols are finally mapped to resource elements (i.e. the final mapping of modulation symbols to SC-FDMA symbols and subcarriers). For clarity of exposition, this mapping order is herein described in terms of subcarrier puncturing, subcarrier rearrangement, multiplexing and/or subcarrier repetition functions. However these functions can all be described and implemented in a single resource element mapping function that produces the same mapping of modulation symbols to resource elements as described herein with reference to subcarrier puncturing, subcarrier rearrangement, multiplexing and/or subcarrier repetition functions.

Figure 7:
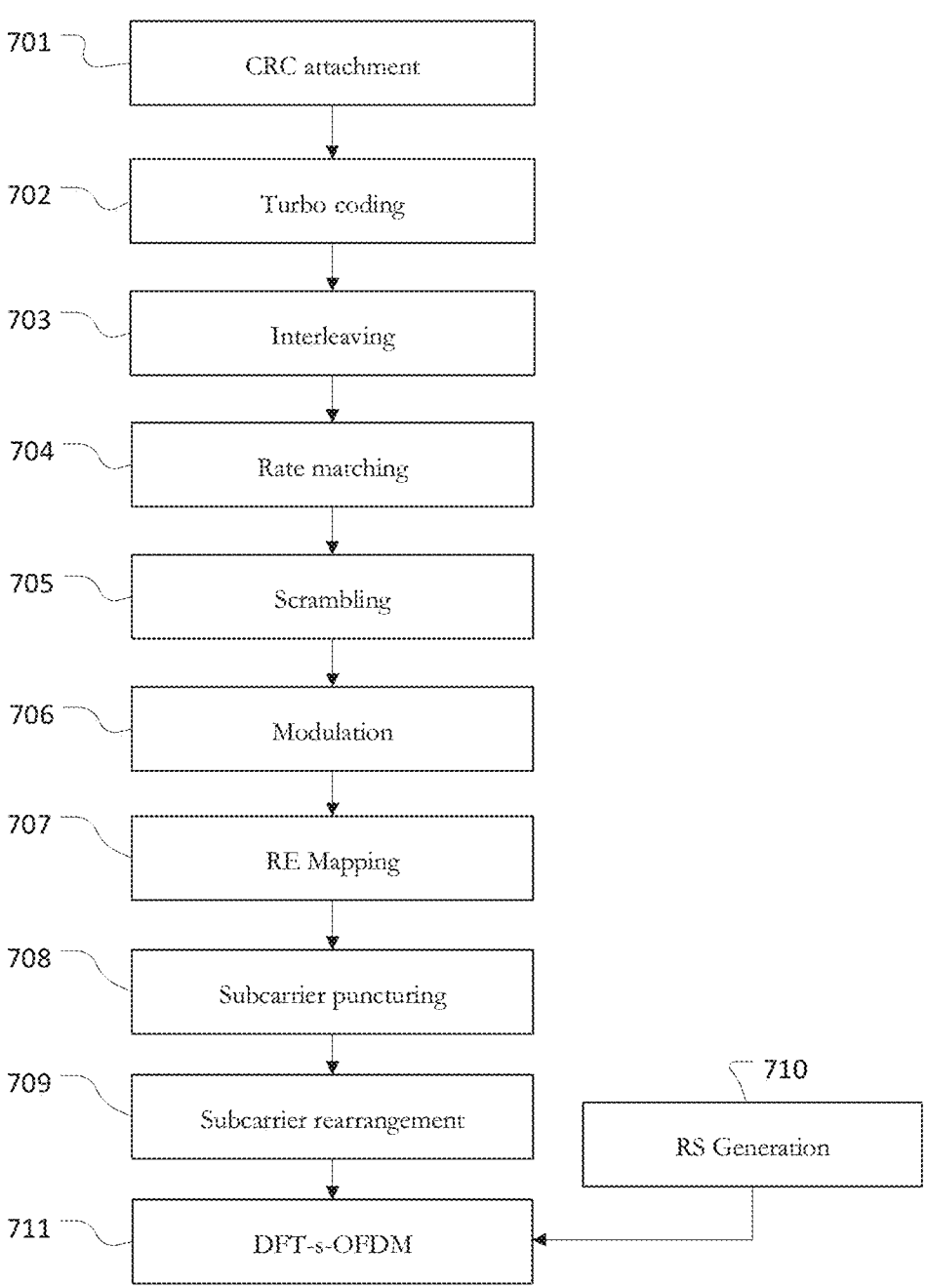
FIG. 7 shows a PUSCH transport channel processing chain including subcarrier puncturing and rearrangement.

FIG. 7 shows a PUSCH transport channel processing chain including subcarrier puncturing and rearrangement. Compared to FIG. 2, this figure includes the additional steps of subcarrier puncturing 708 and subcarrier rearrangement 709. Subcarrier puncturing 708 and subcarrier rearrangement 709 is performed e.g. as described above with regard to the embodiment of FIG. 6.

It should be appreciated that although the sub-carrier puncturing would mean in each subframe the eNB would obtain only a fraction of the required bits, the repetition does not need to be a multiple of the CTTIs. That is for example, if we use 3 sub-carriers and the CTTI is 4 subframes, it is possible to have a repetition that is not multiples of 4 subframes, e.g. the repetition can span 22 subframes. In contrast a TTI that is 4 ms, like in NB-IoT, would mean the repetition would occupy a multiple of 4 subframes.

FIG. 7 shows the operations of a UE. A base station may perform the inverse functions in the reverse order: first operation 711, then 709, 708, . . . 702, and finally 701. In this inverse scenario, the PUSCH enters at 711.

Figure 8:
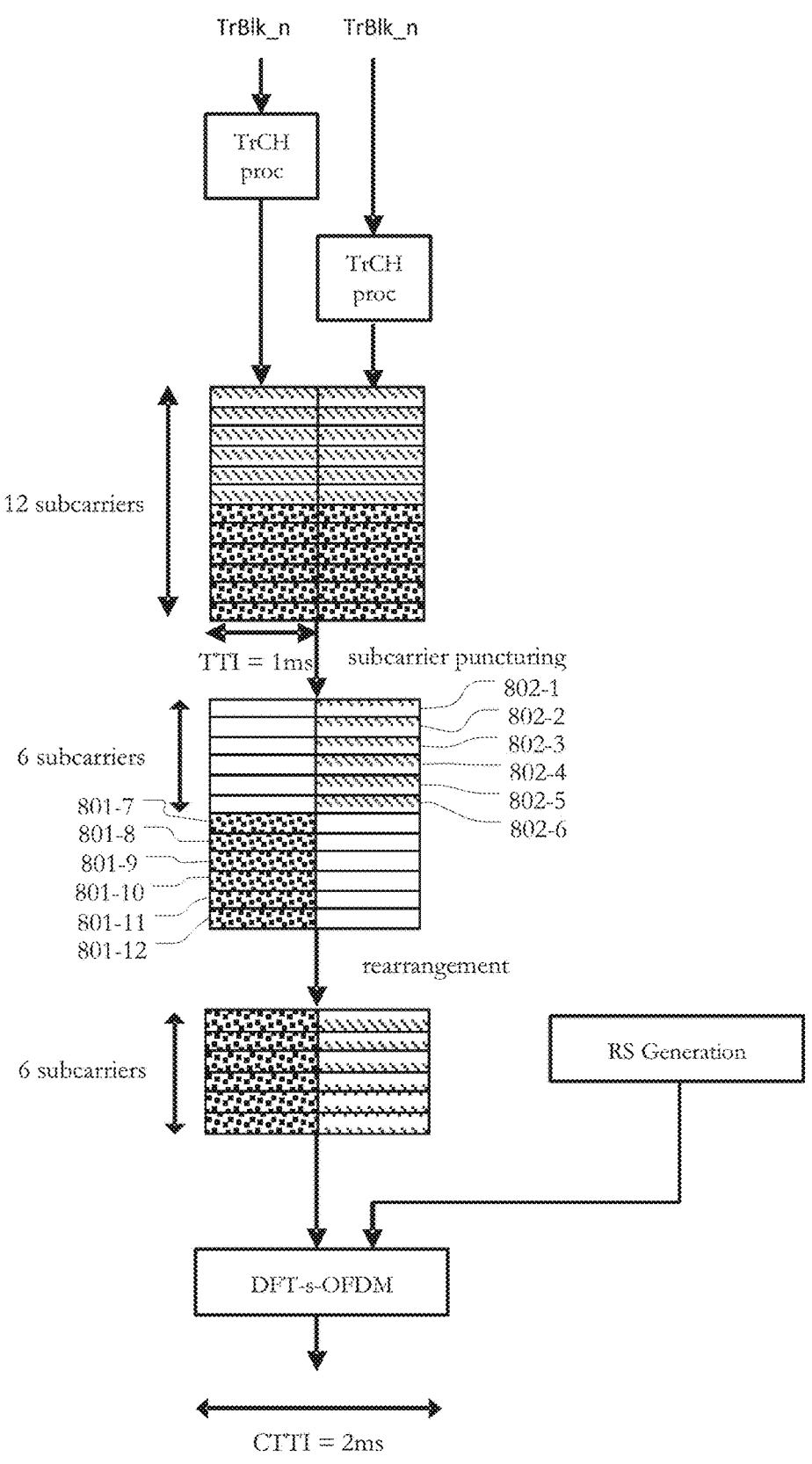
FIG. 8 illustrates a transmission of a 6 subcarrier sub-PRB according to an embodiment.

FIG. 8 illustrates a transmission of a 6 subcarrier sub-PRB according to an embodiment. In each subframe of the CTTI, the transport block is mapped to 12 subcarriers, up to and including the resource element mapping stage. Subcarrier puncturing is performed on these 12 subcarriers. In the subcarrier puncturing process, in the first subframe of the CTTI, the lowest 6 subcarriers 801-7, 801-8, 801-9, 801-10, 801-11, 801-12 of the 12 subcarriers are kept and the other 6 subcarriers are punctured. Accordingly, in the second subframe of the CTTI, the next 6 subcarriers 802-1, 802-2, 802-3, 802-4, 802-5, 802-6 are kept and the other 6 subcar-riers are punctured. In a next operation, the remaining subcarriers are rearranged to occupy the same 6 subcarriers. Then, reference signals (RS) are generated and inserted into the 6 subcarriers of the sub-PRB transmission. Finally, the signal is DFT-s-OFDM modulated and transmitted.

The above method of creating sub-PRB transmissions is difficult to apply to 9 subcarrier transmissions. Hence in another embodiment the CTTI is fixed and transport blocks are initially mapped to a multiple of 12-subcarrier-PRBs. Hence in this embodiment the CTTI is fixed at 4 ms (4 subframes) for 3, 6 & 9 subcarrier sub-PRB transmissions. For 3 subcarriers it is rate matched to 12 subcarriers and 9 subcarriers are punctured (75% of the subcarriers). For 6 subcarriers it is rate matched to 2 PRBs (24 subcarriers) and 18 subcarriers are punctured (75% of the subcarriers). And for 9 subcarriers it is rate matched to 3 PRBs (36 subcarriers) and 27 subcarriers are punctured (75% of the subcarriers).

The transmission of a 3-subcarrier sub-PRB PUSCH is as shown in FIG. 6.

Figure 9:
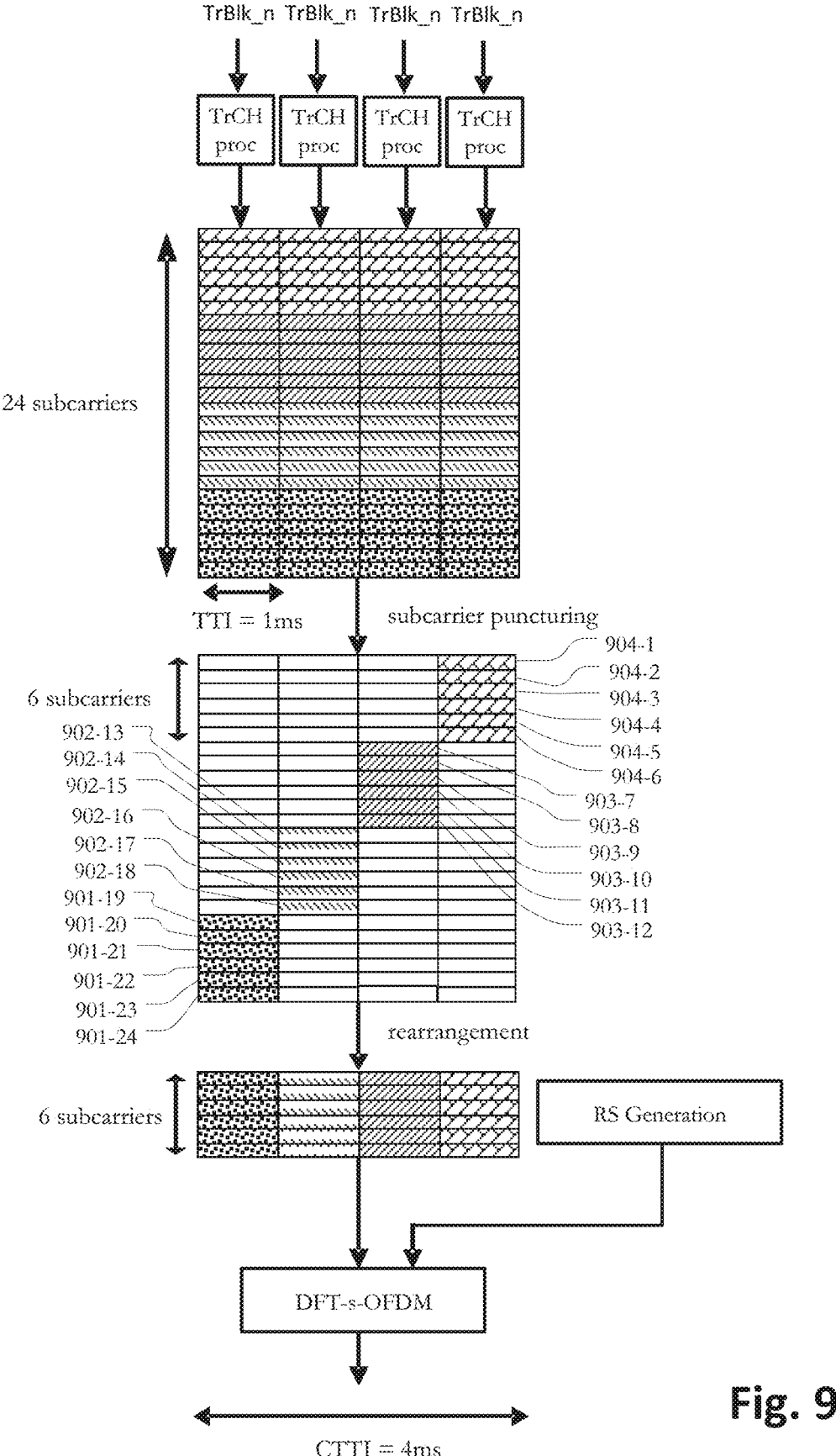
FIG. 9 shows a transmission of a 6 subcarrier sub-PRB according to an embodiment.

FIG. 9 shows a transmission of a 6-subcarrier sub-PRB according to an embodiment of a 6-subcarrier sub-PRB and a CTTI of 4 ms. In each subframe of the CTTI, the transport block is mapped to 24 subcarriers (the principles of the mapping between sub-PRB size and number of subcarriers mapped to in transport channel processing is as explained with regard to), up to and including the resource element mapping stage. In the subcarrier puncturing process, in the first subframe of the CTTI, the lowest 6 subcarriers 901-19, 901-20, 901-21, 901-22, 901-23, 901-24 of the 24 subcar-riers are kept and the other 18 subcarriers are punctured. In the second subframe of the CTI, the next 6 subcarriers 902-13, 902-14, 902-15, 902-16, 902-17, 902-18 are kept and the other 18 subcarriers are punctured. In the third subframe of the CTTI, the next 6 subcarriers 903-7, 903-8, 903-9, 903-10, 903-11, 903-12 are kept and the other 18 subcarriers are punctured. In the fourth subframe of the CTTI, the next 6 subcarriers 904-1, 904-2, 904-3, 904-4, 904-5, 904-6 are kept and the other 18 subcarriers are punctured. The remaining subcarriers are rearranged to occupy the same 6 subcarriers. In all cases, this re-arrange-ment can be achieved by the skilled person by choosing the set of modulation symbols to map into the REs that reflect the DFT-s-OFDM sub-carriers to be retained. Reference signals are generated and inserted into the 6 subcarriers of the sub-PRB transmission. The signal is DFT-s-OFDM modulated and transmitted.

As described before, NB-IoT uses sub-PRB PUSCH where the TTI of the PUSCH is extended to provide the number of physical resources (REs) equivalent to that of a PRB. In contrast the embodiment described above does not extend the TTI but rather introduces a sub-carrier puncturing function. Since the TTI in the embodiments is not increased, the repetition does not need to span multiples of CTTI but rather multiples of TI.

As a consequence, the sub-carrier puncturing according to the embodiments described above may easier be imple-mented on legacy hardware than sub-PRB PUSCH of NB-IoT.

Sub-PRB Resource Allocation Signalling

As it has been described above, the transport channel processing chain maps to an N subcarrier sub-PRB wave-form. The sub-PRB allocation to the device can be signaled using DCI (downlink control channel information) signal-ing, by extending the resource allocation field in the DCI message that allocates UL resource (i.e. by extending the resource allocation field in DCI format 6-0A and/or DCI format 6-0B). This can be implemented as a new DCI format (e.g. "DCI format 6-0C").

The current DCI format 6-0B as defined in [3] has a resource allocation field that indicates a narrowband to the UE and the resources (i.e. PRB allocation) within the narrowband, as below:

$$\left\lceil \log_2 \left\lfloor \frac{N_{RB}^{UL}}{6} \right\rfloor \right\rceil$$

MSB bits provide the narrowband index as defined in section 5.2.4 of [2]

In addition, 3 bits provide the resource allocation within the indicated narrowband as specified in section 8.1.3 of [3].

The resource allocation information for uplink resource allocation type 2 indicates to a scheduled UE a set of contiguously allocated resource blocks within a narrowband as given in Table 8.1.3-1 of [4]. According to this current scheme, a value '000' of the resource allocation field allo-cates resource block 0, a value '001' of the resource allo-cation field allocates resource block 1, a value '010' of the resource allocation field allocates resource block 2, a value '011' of the resource allocation field allocates resource block 3, a value '100' of the resource allocation field allocates resource block 4, a value '101' of the resource allocation field allocates resource block 5, a value '110' of the resource allocation field allocates resource blocks 0 and 1, and a value '111' of the resource allocation field allocates resource blocks 2 and 3.

According to the embodiments, DCI format 6-0B is extended by having a resource allocation field that indicates a narrowband, a PRB within the narrowband and a set of contiguous subcarriers within the narrowband.

For a 3-subcarrier sub-PRB allocation in the set of contiguous subcarriers within the narrowband 2 bits can indicate one of 4 sets of 3-subcarrier contiguous allocations (starting at subcarrier 0, 3, 6 or 9 within the PRB).

For a 6-subcarrier sub-PRB allocation, the set of contiguous subcarriers within the narrowband can be indicated by 1 bit where one of 2 sets of 6-subcarrier contiguous allocations (starting at subcarrier 0 or 6 within the PRB) can be indicated, or by 2 bits where one of 3 sets of 6-subcarrier contiguous allocations (starting at subcarrier 0, 3 or 6 within the PRB) can be indicated.

For either a 3-subcarrier or 6 subcarrier sub-PRB allocation 1 bit can indicate the number of subcarriers within the allocation and 2 bits can indicate the starting location of the allocated subcarriers within the allocation.

Hence the following resource allocation signalling for indicating the sub-PRB allocation could be applied: A resource allocation bit string indicates the number of sub-carriers and the starting subcarrier within PRB. According to an embodiment, the resource allocation bit string '000' indicates a number of 3 subcarriers and a starting subcarrier 0. The resource allocation bit string '001' indicates a number of 3 subcarriers and a starting subcarrier 3. The resource allocation bit string '010' indicates a number of 3 subcarriers and a starting subcarrier 6. The resource allocation bit string '011' indicates a number of 3 subcarriers and a starting subcarrier 9. The resource allocation bit string '100' indicates a number of 6 subcarriers and a starting subcarrier 0. The resource allocation bit string '101' indicates a number of 6 subcarriers and a starting subcarrier 3. The resource allocation bit string '110' indicates a number of 6 subcarriers and a starting subcarrier 6, and the resource allocation bit string '111' may be reserved.

The UE can be signaled (e.g. via RRC signaling) whether it should operate in a sub-PRB transmission mode or not (and hence whether it should interpret DCI as allocating sub-PRB transmissions or should interpret DCI as allocating legacy (Release-14 and earlier) whole-PRB transmissions).

Creating Low PAPR Sub-PRB Waveforms

According to the embodiments described below, in order to create low PAPR 3-subcarrier sub-PRB waveforms, the transport channel processing chain maps to a single subcarrier per subframe. The resource element of each OFDM symbol of the single carrier is then repeated in the other two subcarriers of the 3-subcarrier sub-PRB waveform in the same OFDM symbol. Here, a 3-subcarrier sub-PRB waveform is an example and it has been defined as the minimum number of sub-carriers for sub-PRB transmission in efeMTC [1].

Any method of mapping to a single subcarrier per subframe can be applied in this embodiment (e.g. the NB-IoT method described previously with reference to FIG. 5). In the following, we describe this embodiment with reference to an encoding methodology that is compatible with the sub-carrier puncturing previously described.

Figure 10:
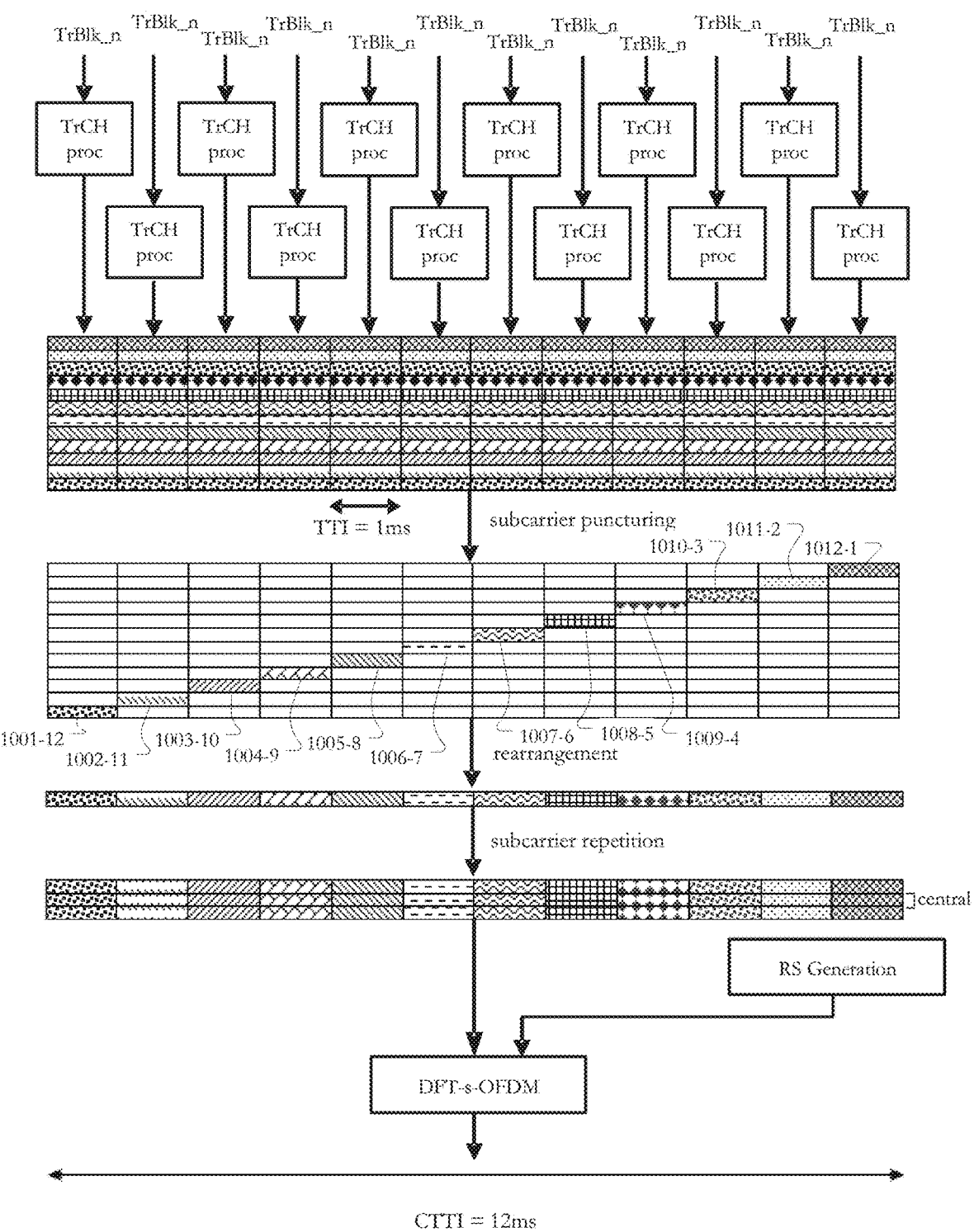
FIG. 10 shows the generation of low PAPR 3-subcarrier sub-PRB transmission according to an embodiment.

FIG. 10 shows the generation of low PAPR 3-subcarrier sub-PRB transmissions according to an embodiment. According to this embodiment, the CTTI is 12 subframes. In each subframe of the CTTI, the transport block is mapped to 12 subcarriers, up to and including the resource element mapping stage. In the subcarrier puncturing process, in the first subframe of the CTTI, the lowest subcarrier 1001-12 of the 12 subcarriers is kept and the other 11 subcarriers are punctured. In the second subframe of the CITI, the next subcarrier 1002-11 is kept and the other 11 subcarriers are punctured. In the third subframe of the CITI, the next subcarrier 1003-10 is kept and the other 11 subcarriers are punctured. In the fourth subframe of the CII, the next subcarrier 1004-9 is kept and the other 11 subcarriers are punctured. In the 5th subframe of the CITI, the next sub-carrier 1005-8 is kept and the other 11 subcarriers are punctured. In the 6th subframe of the CITI, the next sub-carrier 1006-7 is kept and the other 11 subcarriers are punctured. In the 7th subframe of the CTI, the next subcar-rier 1007-6 is kept and the other 11 subcarriers are punc-tured. In the 8th subframe of the CITI, the next subcarrier 1008-5 is kept and the other 11 subcarriers are punctured. In the 9th subframe of the CITI, the next subcarrier 1009-4 is kept and the other 11 subcarriers are punctured. In the 10th subframe of the CII, the next subcarrier 1010-3 is kept and the other 11 subcarriers are punctured. In the 11th subframe of the CITI, the next subcarrier 1011-2 is kept and the other 11 subcarriers are punctured. In the 12th subframe of the CITI, the next subcarrier 1012-1 is kept and the other 11 subcarriers are punctured. As a next operation, the remaining subcarriers are rearranged to occupy the same 1 subcarrier. As a next operation, this single subcarrier is then repeated to create 3 subcarriers containing identical resource elements. As a next operation, reference signals RS are generated and inserted into the 3 subcarriers of the sub-PRB transmission.

Figure 11:
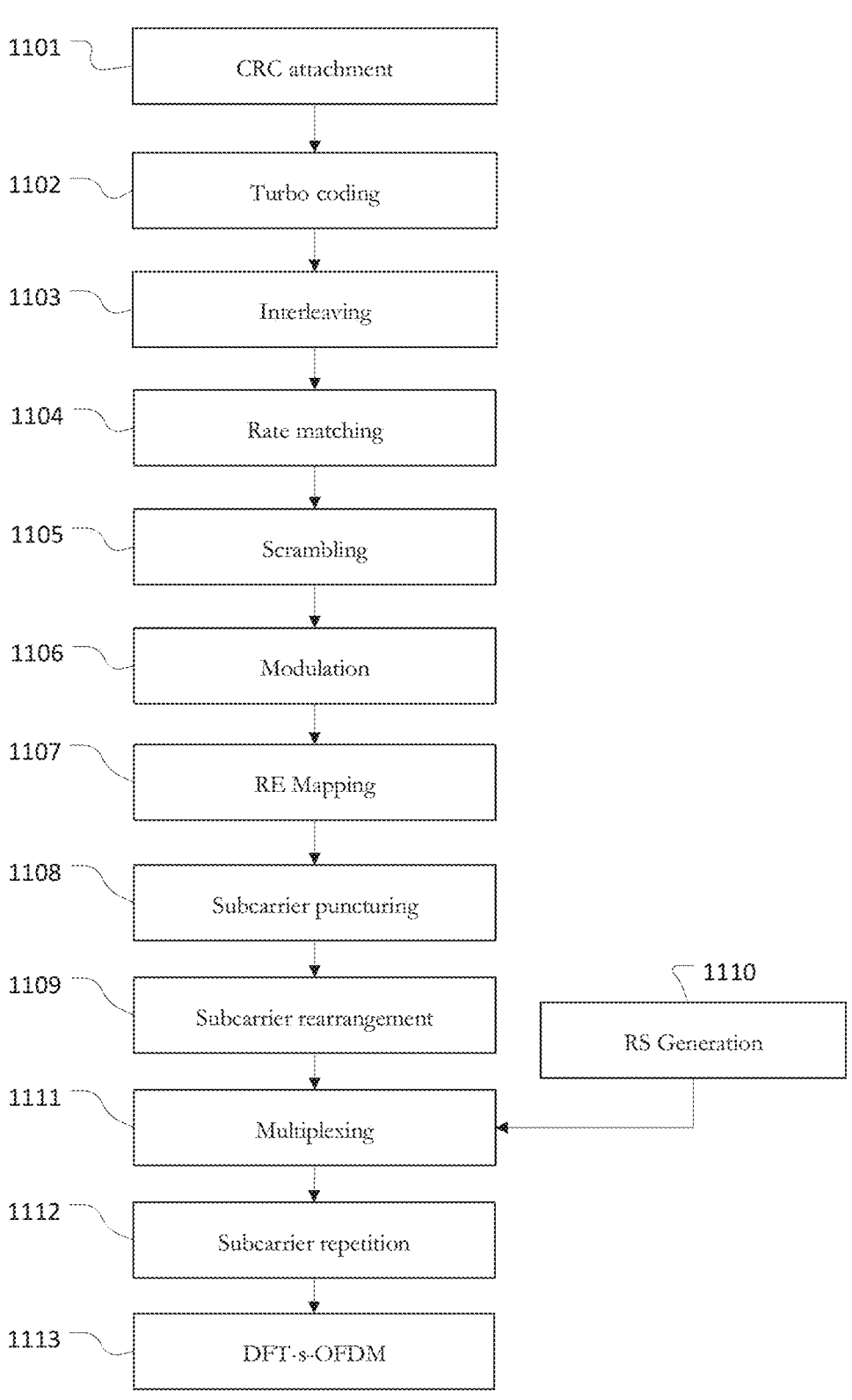
FIG. 11 shows the transport and physical channel pro-cessing chain for the generation of a low PAPR 3-subcarrier sub-PRB transmission.

The insertion operation is a form of multiplexing, whereby the reference signals and PUSCH REs are multi-plexed together. The reference signals themselves can be formed as repeated resource elements in the subcarrier domain (alternatively, RS can be inserted into the single subcarrier prior to the subcarrier repetition stage, as shown in FIG. 11, where the RS are inserted via a multiplexing stage 1111, prior to being repeated in the subcarrier repeti-tion stage 1112). The signal is DFT-s-OFDM modulated and transmitted.

In an embodiment, the power of the individual subcarriers can be different (e.g. the central subcarrier (bracket "central" in FIG. 10) transmits 50% of the total transmit power and the two adjacent subcarriers each transmit 25% of the total transmit power). This arrangement concentrates the UE transmit power in the subcarrier that is furthest away from interference from other UEs (e.g. adjacent channel leakage from other UEs that are scheduled in adjacent subcarriers).

FIG. 11 shows the transport and physical channel pro-cessing chain for the generation of low PAPR 3-subcarrier sub-PRB transmissions. At 1109, a single subcarrier trans-mission is created at the "subcarrier rearrangement" stage. At 1111, multiplexing of reference signals into the single subcarrier is performed. At 1112, in a subcarrier repetition stage, a 3 times repetition of the subcarrier is performed in order to enable a low PAPR signal to be created in the DFT-s-OFDM stage. The remaining operations are identical to FIG. 7.

For this embodiment, relative to a 3-subcarrier sub-PRB transmission, where the 3-subcarriers all transmit different resource elements (FIG. 6), there are several ways that the transport block can be adapted to the smaller amount of physical resource. The CTTI may be increased by a factor of 3 (e.g. as shown in FIG. 10) and the transport block size is unaffected. Alternatively, the CTTI is maintained (e.g. 4 ms CTTI) and the transport block size (TBS) is reduced (e.g. by a factor of 3). Still alternatively, the CTTI and TBS are maintained, but the modulation and coding scheme (MCS) applied uses a higher MCS (e.g. if an MCS of QPSK rate 1/12 were used in the aspect shown in FIG. 6, an MCS of QPSK rate 1/4 could be used in the embodiment shown in FIG. 10, since FIG. 10 contains 3 times less physical resource than FIG. 6).

FIG. 10 shows how a low-PAPR waveform for a 3-sub-carrier sub-PRB transmission can be created. It will be readily apparent to a skilled artisan that this technique can also be applied to the creation of a low-PAPR waveform for a 6-subcarrier sub-PRB transmission (through 6-fold repetition of the single subcarrier created at the "subcarrier rearrangement" stage of FIG. 10).

As it has been described, in this method of creating low PAPR sub-PRB waveforms the transport channel processing chain maps to L subcarriers per subframe (e.g. L=1). The resource element is then repeated M times (e.g. M=3) in the other subcarriers to form an N subcarrier sub-PRB waveform (N=L*M). This method where the uplink signal from UE has a low PAPR property can be implemented as a distinct capability of the device. In order to support this operation a UE can indicate its capability to support this operation. Still further, a UE can indicate its uplink transmission preferences (e.g. low PAPR or legacy method) to the network via higher layer signaling (e.g RRC). Still further, the network/base-station can instruct the UE to perform such low PAPR uplink transmission via downlink control message signalling (e.g. downlink control information (DCI)). For example the DCI can indicate L and/or M to the UE. The UE can then derive the parameters L and M parameters from the N parameter, where the rules for this derivation are indicated either by standardisation or by RRC signalling.

In the above DCI signaling, the location (in the subcarrier resource space) of the sub-PRB resource allocation can be indicated as previously described in the section "Sub-PRB resource allocation signalling" and the DCI signaling described above can be used in addition to that signaling previously described.

Implementation

In the following, an embodiment of a general purpose computer 130 is described under reference of FIG. 12. The computer 130 can be implemented such that it can basically function as any type of apparatus or entity, base station or new radio base station, transmission and reception point, or user equipment as described herein. The computer has components 131 to 140, which can form a circuitry, such as any one of the circuitries of the entities, base stations, and user equipment, as described herein.

Embodiments which use software, firmware, programs or the like for performing the methods as described herein can be installed on computer 130, which is then configured to be suitable for the concrete embodiment.

The computer 130 has a CPU 131 (Central Processing Unit), which can execute various types of procedures and methods as described herein, for example, in accordance with programs stored in a read-only memory (ROM) 132, stored in a storage 137 and loaded into a random access memory (RAM) 133, stored on a medium 140, which can be inserted in a respective drive 139, etc.

The CPU 131, the ROM 132 and the RAM 133 are connected with a bus 141, which in turn is connected to an input/output interface 134. The number of CPUs, memories and storages is only exemplary, and the skilled person will appreciate that the computer 130 can be adapted and configured accordingly for meeting specific requirements which arise when it functions as a base station, and user equipment.

At the input/output interface 134, several components are connected: an input 135, an output 136, the storage 137, a communication interface 138 and the drive 139, into which a medium 140 (compact disc, digital video disc, compact flash memory, or the like) can be inserted.

The input 135 can be a pointer device (mouse, graphic table, or the like), a keyboard, a microphone, a camera, a touchscreen, etc.

The output 136 can have a display (liquid crystal display, cathode ray tube display, light emittance diode display, etc.), loudspeakers, etc.

The storage 137 can have a hard disk, a solid state drive and the like.

The communication interface 138 can be adapted to communicate, for example, via a local area network (LAN), wireless local area network (WLAN), mobile telecommunications system (GSM, UMTS, LTE, etc.), Bluetooth, infrared, etc.

It should be noted that the description above only pertains to an example configuration of computer 130. Alternative configurations may be implemented with additional or other sensors, storage devices, interfaces or the like. For example, the communication interface 138 may support other radio access technologies than the mentioned UMTS and LTE.

When the computer 130 functions as a base station, the communication interface 138 can further have a respective air interface (providing e.g. E-UTRA protocols OFDMA (downlink) and SC-FDMA (uplink)) and network interfaces (implementing for example protocols such as S1-AP, GTP-U, S1-MME, X2-AP, or the like). Moreover, the computer 130 may have one or more antennas and/or an antenna array. The present disclosure is not limited to any particularities of such protocols.

The methods as described herein are also implemented in some embodiments as a computer program causing a computer and/or a processor and/or a circuitry to perform the method, when being carried out on the computer and/or processor and/or circuitry. In some embodiments, also a non-transitory computer-readable recording medium is provided that stores therein a computer program product, which, when executed by a processor/circuitry, such as the processor/circuitry described above, causes the methods described herein to be performed.

It should be recognized that the embodiments describe methods with an exemplary ordering of method steps. The specific ordering of method steps is, however, given for illustrative purposes only and should not be construed as binding.

Figure 12:
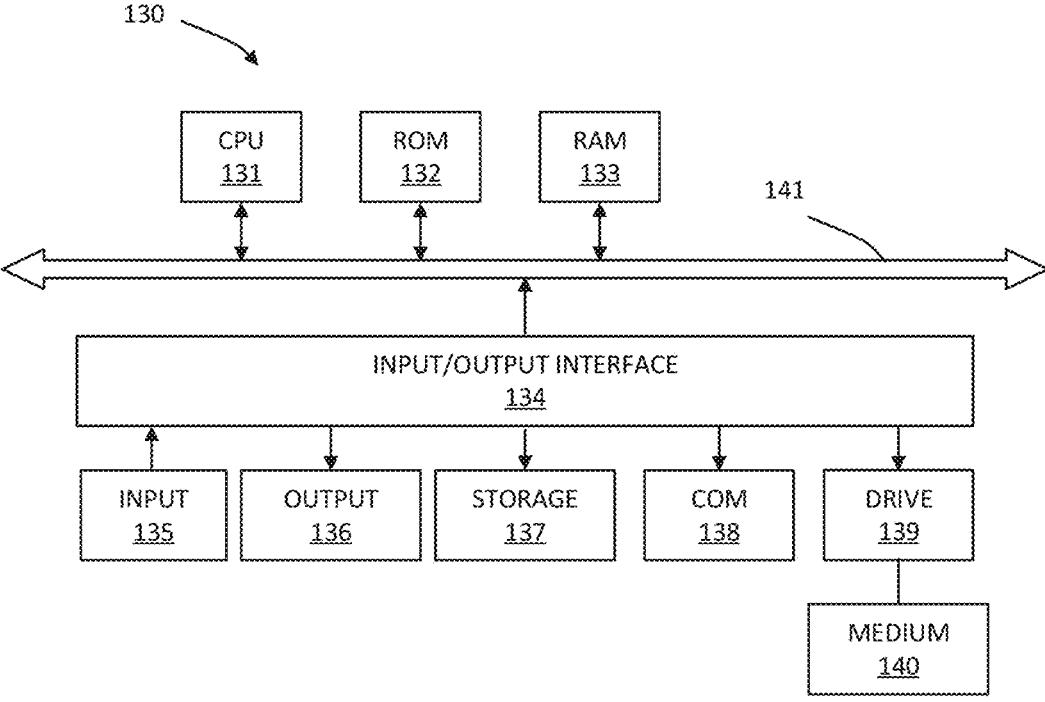
FIG. 12 shows an embodiment of a general purpose computer that can function as any type of apparatus or entity, base station or new radio base station, transmission and reception point, or user equipment as described herein.

It should also be noted that the division of the control or circuitry of FIG. 12 into units 131 to 140 is only made for illustration purposes and that the present disclosure is not limited to any specific division of functions in specific units. For instance, at least parts of the circuitry could be implemented by a respective programmed processor, field programmable gate array (FPGA), dedicated circuits, and the like.

All units and entities described in this specification and claimed in the appended claims can, if not stated otherwise, be implemented as integrated circuit logic, for example on a chip, and functionality provided by such units and entities can, if not stated otherwise, be implemented by software.

In so far as the embodiments of the disclosure described above are implemented, at least in part, using software-controlled data processing apparatus, it will be appreciated that a computer program providing such software control and a transmission, storage or other medium by which such a computer program is provided are envisaged as aspects of the present disclosure.

The methods as described herein are also implemented in some embodiments as a computer program causing a computer and/or a processor and/or a circuitry to perform the method, when being carried out on the computer and/or processor and/or circuitry. In some embodiments, also a non-transitory computer-readable recording medium is provided that stores therein a computer program product, which, when executed by a processor/circuitry, such as the processor/circuitry described above, causes the methods described herein to be performed.

It should be recognized that the embodiments describe methods with an exemplary ordering of method steps. The specific ordering of method steps is, however, given for illustrative purposes only and should not be construed as binding.

It should also be noted that the division of the control or circuitry of FIG. 8 into units 131 to 140 is only made for illustration purposes and that the present disclosure is not limited to any specific division of functions in specific units. For instance, at least parts of the circuitry could be implemented by a respective programmed processor, field programmable gate array (FPGA), dedicated circuits, and the like.

All units and entities described in this specification and claimed in the appended claims can, if not stated otherwise, be implemented as integrated circuit logic, for example on a chip, and functionality provided by such units and entities can, if not stated otherwise, be implemented by software.

In so far as the embodiments of the disclosure described above are implemented, at least in part, using software-controlled data processing apparatus, it will be appreciated that a computer program providing such software control and a transmission, storage or other medium by which such a computer program is provided are envisaged as aspects of the present disclosure.

Note that the present technology can also be configured as described below.

(1) An apparatus comprising circuitry configured to perform a transport channel processing chain (TrCH proc), the transport channel processing chain (TrCH proc) comprising sub-carrier puncturing function (708; 1108), the sub-carrier puncturing function comprising puncturing, in each subframe (ITI) of a composite transmission time interval (CTTI), a set of subcarriers from at least one mapped physical resource block (PRB).

(2) The apparatus of (1), wherein the circuitry is configured to puncture the set of subcarriers so that the sets of subcarriers that are punctured are different between subframes (ITI) of a composite transmission time interval (CTTI).

(3) The apparatus of anyone of (1) or (2), wherein the transport channel processing chain is based on a composite transmission time interval (CTTI) that comprises two or more subframes (ITI).

(4) The apparatus of anyone of (1) to (3), wherein the transport channel processing comprises mapping (707, 1107), in each subframe (ITI) of a composite transmission time interval (CTTI), a transport block (TrBlk_n) to an integer number of physical resource blocks (PRBs) in a single subframe (ITI).

(5) The apparatus of anyone of (1) to (4), wherein the transport channel processing (TrCH proc) comprises rearranging (709; 1109), the subcarriers that remain after puncturing, in the frequency domain to occupy the allocated frequency resources.

(6) The apparatus of anyone of (1) to (5), wherein the circuitry is configured to transmit a 3 subcarrier sub-PRB transmission or a 6 subcarrier sub-PRB transmission.

(7) The apparatus of anyone of (1) to (6), wherein the composite transmission time interval (CTTI) comprises a fixed predefined number of subframes and the base number of physical resource blocks (PRBs) is changed depending on the number of sub-carriers to be used in a sub-PRB transmission.

(8) The apparatus of anyone of (1) to (7), wherein the base number of physical resource blocks (PRBs) is fixed to a predefined number and the composite transmission time interval (CTTI) is adapted to the number of sub-carriers used in the sub-PRB transmission.

(9) The apparatus of anyone of (1) to (8), wherein the circuitry is configured to receive DCI (downlink control channel information) signaling indicating parameters of the sub-PRB allocation.

(10) The apparatus of anyone of (1) to (9), wherein the transport channel processing chain comprises repeating (1112) resource elements in other subcarriers of a sub-PRB waveform in the same subframe (TTI).

(11) The apparatus of anyone of (1) to (10), wherein the circuitry is configured to map (1107; 1108) a transport block (TrBlk_n) to a single subcarrier per subframe, and wherein the transport channel processing chain comprises repeating (1112) the resource elements of each subframe of the single carrier in other subcarriers in the same OFDM symbol of each subframe.

(12) The apparatus of anyone of (1) to (11), wherein the circuitry is configured to transmit the individual sub-carriers with different powers.

(13) The apparatus of anyone of (1) to (12), wherein the transport channel processing chain comprises multiplexing (1111) of reference signals into a single sub-carrier.

(14) The apparatus of anyone of (1) to (13), wherein the circuitry is configured to receive downlink control messaging signaling indicating that the circuitry shall perform low Peak-to-Average Power Ratio (PAPR) uplink transmission.

(15) The apparatus of anyone of (1) to (14), wherein the transport channel processing chain (TrCH proc) is a Physical Uplink Shared Channel resources (PUSCH) transport channel processing chain.

(16) An apparatus comprising circuitry configured to receive sets of a predefined number of subcarriers in each subframe and consider the remaining subcarriers as being punctured.

(17) The apparatus of (16), wherein the circuitry is configured to receive an indication of a UE's uplink transmission preferences to the network via higher layer signaling.

(18) The apparatus of anyone of (16) or (17), wherein the circuitry is configured to transmit an indication of the use of Peak-to-Average Power Ratio (PAPR) uplink transmission to the user equipment via higher layer signaling.

(19) The apparatus of anyone of (16) or (17), wherein the apparatus is a base station that receives higher layer signaling from a UE.

(20) The apparatus of anyone of (16) to (19), wherein the apparatus is a base station that transmits higher layer signaling to a user equipment.

(21) A method for performing a transport channel processing chain, the transport channel processing chain comprising sub-carrier puncturing (708; 1108), the sub-carrier puncturing function comprising puncturing, in each OFDM symbol of each subframe (ITI) of a composite transmission time interval (CTTI), a set of subcarriers from at least one mapped physical resource block (PRB).

(22) The method of (21), wherein the transport channel processing chain further comprises rearranging (709; 1109), the subcarriers that remain after puncturing, in the frequency domain to occupy the allocated frequency resources.

(23) The method of (21), wherein the transport channel processing chain further comprises repeating (1112) resource elements in other subcarriers of a sub-PRB waveform in the same OFDM symbol of each subframe (ITI).

(24) A computer program comprising program code causing a computer to perform the method according to anyone of (21) to (23), when being carried out on a computer.

(25) A non-transitory computer-readable recording medium that stores therein a computer program product, which, when executed by a processor, causes the method according to anyone of (21) to (23) to be performed.

ABBREVIATIONS

3GPP 3rd Generation Partnership Project
LTE Long Term Evolution
VoLTE Voice over LTE
IoT Internet of Things
MTC Machine-type Communication
mMTC massive MTC
NB-IoT NarrowBand IoT (Release-13)
eNB-IoT enhanced NB-IoT (Release-14)
eMTC enhanced MTC (Release-13)
feMTC further enhanced MTC (Release-14)
efeMTC even further enhanced MTC (Release-15)
UE User Equipment
UL Uplink
PUSCH Physical Uplink Shared Channel
PRB Physical Resource Block
CP Cyclic Prefix
DMRS Demodulation Reference Signal
FDMA Frequency-Division Multiple Access
SC-FDMA Single-Carrier FDMA
OFDM Orthogonal Frequency-Division Multiplexing
DFT Discrete Fourier Transform
DFT-s-OFDM DFT-spread-OFDM
QPSK Quadrature Phase-Shift Keying
QAM Quadrature Amplitude Modulation
TTI Transmission Time Interval
RV Redundancy Version
RE Resource Element
LLR Log-Likelihood Ratio
TrBlk Transport Block
PSD Power Spectral Densitiy
PAPR Peak-to-Average Power Ratio
CTTI Composite Transmission Time Interval
DCI Downlink Control Channel Information
TBS Transport Block Size
MCS Modulation and Coding Scheme
RRC Radio Resource Control

REFERENCES

[1] RP-170732, "New WID on Even further enhanced MTC for LTE," Ericsson, Qualcomm
[2] TS 36.211 v14.2.0, Physical channels and modulation
[3] TS 36.212 v14.2.0, Evolved Universal Terrestrial Radio Access (E-UTRA); Multiplexing and channel coding
[4] TS 36.213 v14.2.0, Evolved Universal Terrestrial Radio Access (E-UTRA); Physical layer procedures

The invention claimed is:

1. An apparatus including a processor and a memory, the processor and the memory being configured to:
perform a transport channel processing chain including keeping, in each subframe of a composite transmission time interval, only a set of subcarriers from at least one mapped physical resource block, wherein the sets of subcarriers that are kept are different between subframes of a composite transmission time interval, and
rearranging the kept subcarriers in the frequency domain to occupy the same frequency resources.

2. The apparatus of claim 1, wherein the transport channel processing chain is based on a composite transmission time interval that comprises two or more subframes.

3. The apparatus of claim 1, wherein the transport channel processing comprises mapping, in each subframe of a composite transmission time interval, a transport block to an integer number of physical resource blocks in a single subframe.

4. The apparatus of claim 1, wherein the processor and the memory are further configured to transmit a 3 subcarrier sub-PRB transmission or a 6 subcarrier sub-PRB transmission.

5. The apparatus of claim 1, wherein the composite transmission time interval comprises a fixed predefined number of subframes and the base number of physical resource blocks is changed depending on the number of sub-carriers to be used in a sub-PRB transmission.

6. The apparatus of claim 1, wherein the base number of physical resource blocks is fixed to a predefined number and the composite transmission time interval is adapted to the number of sub-carriers used in the sub-PRB transmission.

7. The apparatus of claim 1, wherein the processor and the memory are further configured to receive downlink control channel information signaling indicating parameters of the sub-PRB allocation.

8. The apparatus of claim 1, wherein the transport channel processing chain comprises repeating resource elements in other subcarriers of a sub-PRB waveform in the same subframe.

9. The apparatus of claim 1, wherein the processor and the memory are further configured to map a transport block to a single subcarrier per subframe, and wherein the transport channel processing chain comprises repeating the resource elements of each subframe of the single carrier in other subcarriers in the same OFDM symbol of each subframe.

10. The apparatus of claim 1, wherein the processor and the memory are further configured to transmit the individual subcarriers with different powers.

11. The apparatus of claim 1, wherein the transport channel processing chain comprises multiplexing of reference signals into a single subcarrier.

12. The apparatus of claim 1, wherein the processor and the memory are further configured to receive downlink control messaging signaling indicating that the circuitry shall perform low Peak-to-Average Power Ratio uplink transmission.

13. The apparatus of claim 1, wherein the transport channel processing chain is a Physical Uplink Shared Channel resources transport channel processing chain.

14. An apparatus including a processor and a memory, the processor and the memory being configured to:

receive sets of a predefined number of subcarriers in each subframe, wherein the remaining subcarriers are not kept, wherein the sets of subcarriers that are kept are different between subframes of a composite transmission time interval, wherein the received sets of subcarriers occupy the same frequency resources after being rearranged in the frequency domain by a transmitting apparatus.

15. The apparatus of claim 14, wherein the processor and the memory are further configured to receive an indication of a UE's uplink transmission preferences to the network via higher layer signaling.

16. A method, comprising:

performing a transport channel processing chain including keeping, in each subframe of a composite transmission time interval, only a set of subcarriers from at least one mapped physical resource block, wherein the sets of subcarriers that are kept are different between subframes of a composite transmission time interval; and rearranging the kept subcarriers in the frequency domain to occupy the same frequency resources.

17. The method of claim 16, wherein the transport channel processing chain further comprises repeating resource elements in other subcarriers of a sub-PRB waveform in the same OFDM symbol of each subframe.

* * * * *